June 23, 1959

D. DEWAR 2,891,760

FLUID PRESSURE VALVES

Filed Aug. 18, 1953

INVENTOR
Douglas Dewar
by Benj. T. Rauber
his attorney

United States Patent Office 2,891,760
Patented June 23, 1959

2,891,760

FLUID PRESSURE VALVES

Douglas Dewar, Wolston, near Coventry, England, assignor to Dunlop Rubber Company Limited, London, England, a British company Application August 18, 1953, Serial No. 374,872

Claims priority, application Great Britain August 28, 1952

3 Claims. (Cl. 251—44)

My invention relates to fluid pressure valves, and more particularly to a solenoid-operated fast flow valve having a very rapid operation.

Valves having a very rapid operation and designed to pass a large volume of pressure fluid in a comparatively short time, are frequently employed in various pneumatic or hydraulic mechanisms. My invention provides an improved valve having the above characteristics.

According to the present invention a fluid pressure valve comprises a chamber having an inlet for pressure fluid and, an outlet valve seat at one end and a relief valve seat at the opposite end, an annular valve guide fluid-tightly positioned in said chamber between said valve seats, a hollow cylindrical shuttle valve fluid-tightly and axially slidable through said valve guide and having a transverse partition at a location intermediate its ends and having one end adapted to seat on the outlet valve seat and the other end adapted to seat on the relief valve seat, spring means urging said shuttle valve towards the outlet valve seat, means to connect the outlet valve with a mechanism to be operated, means for feeding pressure fluid to both ends of the shuttle valve and an exhaust valve for releasing the pressure fluid at the relief valve end, whereby the shuttle valve moves against its spring to open the outlet valve and close the relief valve.

Preferably both ends of the shuttle valve are chamfered to an annular knife-edge, said knife edge portions being at the inner periphery of the valve. When the outlet valve is shut the relief valve is open and pressure fluid fills the chamber, being retained therein by the closed exhaust valve. On opening the exhaust valve the pressure in the adjacent end of the chamber momentarily drops and the pressure in the other end of the chamber on the chamfered outlet end of the shuttle valve is sufficient to move the shuttle valve to open the outlet valve and close the relief valve. The exhaust valve is preferably solenoid-operated to open. Means may be provided for allowing the outlet valve to close on closing the exhaust valve; otherwise the fast-flow valve will act as a "one-shot" device and will stay open until the pressure from the source is cut off or reduced below a certain value.

Figure 1:
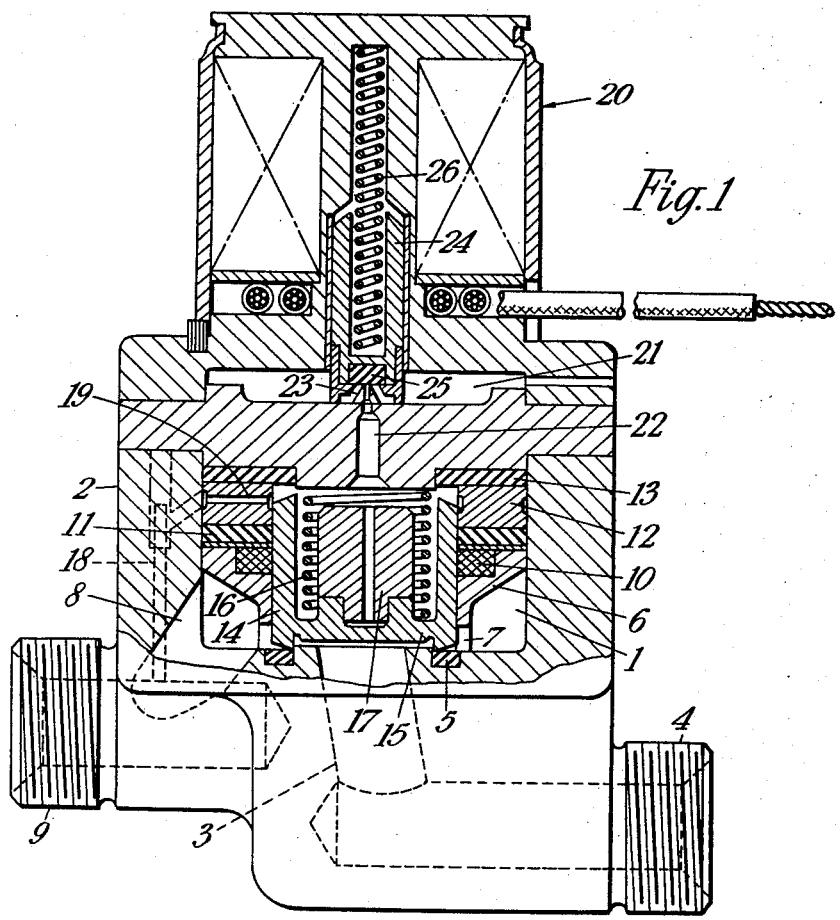
Figure 2:
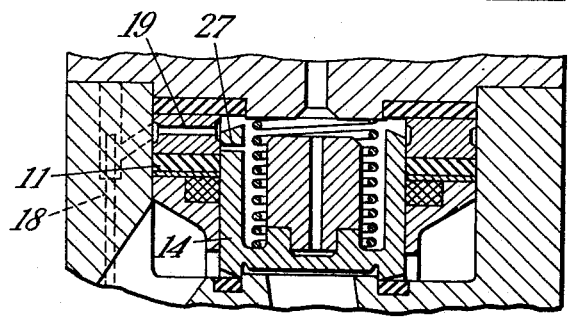

In order that the invention may be more readily described, reference is made to the accompanying drawings, of which:

Figure 1 is a part-sectional view of a pneumatic valve constructed in accordance with the invention and Figure 2 is a section of a part of pneumatic valve constructed in accordance with another embodiment of the invention.

The valve illustrated in Figure 1 comprises an airtight cylindrical chamber 1 located at one end of a housing 2. A conduit 3 leads from one end of said chamber and communicates through an outlet nozzle 4 with a mechanism to be operated. An annular seating ring 5, forming an outlet valve seat, is located in a recess in the said end of the chamber, said valve seat being concencentric with the adjacent end of the conduit 3.

An annular valve guide 6 is fitted in said chamber, said guide being partly of frustro-conical shape and the smaller diameter end thereof is provided with a plurality of projections 7 to abut the end of the chamber adjacent the outer periphery of the valve seating ring 5. The annular passage of substantially triangular section formed between the sloping side of the valve guide and the side and end of the chamber forms a pressure chamber and this communicates through conduit 8 with an inlet nozzle 9 adapted to be connected to a source of pneumatic pressure.

A lubricating ring 10 is fitted in a groove at the inner periphery of the valve guide and abutting the end of said guide remote from the projection 7 is an annular sealing washer 11 which is held in position by a spacing ring 12 which in turn is positioned between said washer 11 and a sealing washer 13 located in an annular recess in the end of the chamber remote from the conduit 3 and forming a relief valve seat.

A cylindrical shuttle-valve 14 is axially and fluid-tightly slidable through the inner periphery of the valve guide 6. Both ends of the shuttle valve are chamfered to a knife-edge, the knife-edge portions both being at the inner periphery of the valve. A partition 15 extends radially across the shuttle valve at a location adjacent the end thereof adjacent the conduit 3 and a helically wound spring 16 is fitted in compression between said partition and the other end of the chamber. This spring normally urges one end of the shuttle valve to seat on the outlet valve seat, the other end of the shuttle valve being then spaced a short distance away from the relief valve seat. A light alloy plug 17 is secured to the relief valve side of the partition to substantially fill the space within the shuttle valve.

A narrow diameter hole 18 extends from the inlet conduit 8 through the wall of the housing 2 and communicates with a hole 19 of smaller diameter which extends radially through the spacing ring 12 and communicates with the interior of the shuttle valve, on the relief valve side thereof, when the relief valve is open. Said hole 19 communicates at each end with an annular recess extending around the inner and outer peripheries of the ring 12.

An electrically operated solenoid assembly 20 is secured to the end of the housing 2 remote from the outlet valve and a space 21 formed between said end and said assembly is adapted to be connected to exhaust. A hole 22 extends axially through this end of the housing, said hole being co-axial with the chamber 1, and an exhaust valve seat 23 is formed at the end of the hole in said space 21. A plunger 24, forming the core of the solenoid, is provided at one end with an exhaust valve 25 to co-operate with said valve seat, and the plunger is forced in a valve seating direction by a spring 26.

The fast-flow valve is connected, as previously described, to a source of pneumatic pressure fluid and to a mechanism to be operated. Pressure fluid, flowing through the inlet nozzle 9, fills the pressure chamber. The outlet valve 5 is closed by one end of the spring-loaded shuttle valve 14, and the exhaust valve 23 is also closed by the spring-loaded valve 25 at the end of the solenoid plunger 24. The relief valve 13, however, is still open and pneumatic pressure from the source flows through holes 18 and 19 and into the interior of the shuttle valve where it reacts against the partition 15 and plug 17 to force the outlet end of said shuttle 14 more securely on the outlet valve seating 5.

To operate the fast-flow valve, a switch is tripped in an electric circuit to energise the coils of the solenoid 20 and move the plunger 24 against the spring 26, thus opening the exhaust valve. Pneumatic pressure from the relief valve side of the shuttle valve flows through the exhaust valve into the space 21 and thence to exhaust, thus causing a sudden drop in pressure at the relief valve side of the pressure chamber. The full pressure from the source, however, is still acting on the chamfered end of the shuttle valve seated on the outlet valve seat, and the consequent force in one direction (i.e. to open the outlet valve) is momentarily greater than the combined forces in the other direction (i.e. to close the outlet valve). The shuttle valve thus moves to open the outlet valve and close the relief valve. As soon as the relief valve is closed the full pressure from the source, acting on the other side of the partition of the shuttle valve, is sufficient to overcome the force of the shuttle valve spring and maintain the relief valve shut and the outlet valve open. The solenoid may then be de-energised and the exhaust valve allowed to close, since the only method of closing the outlet valve is by shutting-off or very substantially decreasing the pressure from the source.

The valve of the present invention is extremely rapid in operation, since it depends for its action on a momentary drop in pressure in one end of the chamber. The aperture provided at the open outlet valve is substantial so that the flow of pneumatic pressure from the chamber and through the valve is not restricted.

A fast-flow of this type is necessarily a "one-shot" device, and is preferably used in a construction such as, e.g. a guided missile or the like. It may, however, be modified to function as an ordinary "on-off" valve of a very fast-flow type, and as such it may be used on a test-rig or any other suitable apparatus. In another embodiment of the invention, therefore, illustrated in Figure 2, a very small hole 27 is provided extending radially through the wall of the shuttle valve adjacent its relief valve end and communicating, when the relief valve is shut, with the hole 19 extending through ring 12. The initial operation of the valve is as hereinabove described but in this embodiment of the invention the outlet valve only remains open for as long as the solenoid is kept energised and the exhaust valve consequently open. The pneumatic pressure from the source flows through the small hole in the shuttle valve and through the exhaust valve to atmosphere. The pressure on the relief valve side of the partition is thus kept considerably lower than the pressure on the other side and thus the outlet valve remains open. When the solenoid is de-energised and the exhaust valve closes under the action of the spring the pressure on the relief valve side of the partition gradually builds up until it equals the pressure on the other side, when the shuttle valve spring will move the shuttle valve to close the outlet valve and open the relief valve.

Although the valve has been described for operation by pneumatic pressure it may easily be adapted for hydraulic operation.

Having described my invention, what I claim is:

1. A fluid pressure valve comprising a housing having a chamber, an outlet at one end of said chamber and a relief passage from the opposite end of said chamber, said housing having annular valve seats, one encircling said outlet and the other encircling said relief passage and having an inlet to the chamber outside the valve seat of said outlet, an annular valve guide positioned fluid-tightly in said chamber between, and co-axial with said valve seats, a hollow cylindrical shuttle valve fluid-tightly and axially slidable in said valve guide to seat alternatively on said annular valve seats, said shuttle valve being closed between its ends and having at each end an inner annular edge to contact its respective annular valve seat and having an end face outside said edge spaced from the opposite face of said valve seat to receive fluid pressure both when said valve is seated and unseated at either end, a spring biasing said valve to seat on said outlet valve seat when fluid pressures on said end faces are balanced, said housing having a restricted passage from said inlet to the relief end of said chamber outside said shuttle valve so that it is cut off from the relief passage upon seating of the shuttle valve on the annular valve seat encircling the relief passage, and a valve to open and to close said relief passage, said shuttle valve having a passage from the end within the edge seating on the valve seat about said relief opening to the cylindrical face of said shuttle valve to align with said restricted passage when said shuttle valve is seated on the annular valve seat about said relief passage.

2. The fluid pressure valve of claim 1 in which the ends of said shuttle valve are chamfered to form said inner annular edges and said end faces and in which said annular valve seats have flat faces on which said annular edges seat.

3. The fluid pressure valve of claim 1 in which said shuttle valve is recessed from each end to form a transverse partition and said spring biasing said shuttle valve to seat on said outlet valve seat is a coil spring confined in a recess of said shuttle valve against the adjacent end of the chamber.

References Cited in the file of this patent

UNITED STATES PATENTS

| | | |
|---|---|---|
| 880,030 | Leavitt | Feb. 25, 1908 |
| 1,200,720 | Fournier | Oct. 10, 1916 |
| 2,251,441 | Dillman | Aug. 5, 1941 |
| 2,367,605 | Oliver | Jan. 16, 1945 |
| 2,460,908 | Scott | Feb. 8, 1949 |
| 2,573,369 | Snoddy | Oct. 30, 1951 |
| 2,796,885 | Garrett | June 25, 1957 |

FOREIGN PATENTS

| | | |
|---|---|---|
| 70,713 | Switzerland | of 1915 |
| 70,822 | Sweden | of 1930 |
| 491,746 | Germany | Feb. 12, 1930 |